(12) United States Patent
Kim et al.

(10) Patent No.: US 6,713,743 B2
(45) Date of Patent: Mar. 30, 2004

(54) FABRY-PEROT RESONATOR AND SYSTEM FOR MEASURING AND CALIBRATING DISPLACEMENT OF A CANTILEVER TIP USING THE SAME IN ATOMIC FORCE MICROSCOPE

(75) Inventors: Jae Wan Kim, Taejon (KR); Tae Bong Eom, Taejon (KR)

(73) Assignee: Korea Research Institute of Standards and Science (KR)

( * ) Notice: Subject to any disclaimer, the term of this patent is extended or adjusted under 35 U.S.C. 154(b) by 0 days.

(21) Appl. No.: 10/457,311

(22) Filed: Jun. 9, 2003

(65) Prior Publication Data

US 2003/0226955 A1 Dec. 11, 2003

(30) Foreign Application Priority Data

Jun. 11, 2002 (KR) ........................................ 2002-32558

(51) Int. Cl.[7] ................................................ G02B 7/04
(52) U.S. Cl. .............................. 250/201.3; 250/227.14; 250/307
(58) Field of Search .......................... 250/201.3, 227.14, 250/227.32, 227.29, 227.11, 306, 307

(56) References Cited

U.S. PATENT DOCUMENTS 5,253,516 A * 10/1993 Elings et al. ................. 73/105

* cited by examiner

Primary Examiner—Que T. Le
(74) Attorney, Agent, or Firm—St. Onge Steward Johnston & Reens LLC

(57) ABSTRACT

Disclosed is an atomic force microscope. A Fabry-Perot interferometer where the intensity of light reflected at a cantilever through an optical fiber varies sensitively to a displacement of the cantilever is constructed to accurately measure a distance between the optical fiber and the cantilever. A Fabry-Perot resonator is formed by the optical fiber having an end of a concave mirror shape and a reflective surface of the cantilever. A displacement of a cantilever tip is measured by detecting a signal reflected at the resonator and a feedback signal corresponding to a variation in the displacement of the cantilever tip is generated. The displacement of the cantilever tip is kept constant by actuating a piezoelectric element in a Z-axis direction.

10 Claims, 3 Drawing Sheets

FABRY-PEROT RESONATOR AND SYSTEM FOR MEASURING AND CALIBRATING DISPLACEMENT OF A CANTILEVER TIP USING THE SAME IN ATOMIC FORCE MICROSCOPE

CROSS-REFERENCES TO RELATED APPLICATIONS

This application claims priority from Korean Patent Application No. 2002-32558 filed on Jun. 11, 2002 in the Korean Intellectual Property Office, the disclosures of which are incorporated herein in their entirety by reference.

BACKGROUND OF THE INVENTION

1. Field Of The Invention

The present invention relates to a cantilever of an atomic force microscope for measuring a surface state of a sample, and more particularly, to a Fabry-Perot resonator using an optical fiber having an end of a concave mirror shape and a system for measuring a displacement of a cantilever tip and keeping the displacement of the cantilever tip constant by use of the Fabry-Perot resonator.

2. Description of the Related Art

An atomic force microscope (AFM) disclosed in U.S. Pat. No. 6,032,518 is a high resolution surface measuring instrument. The AFM scans the surface of a sample while maintaining an interval between a tip fixed at an end of a cantilever which is a head for checking the sample surface and the sample at a few nanometers ($10^{-9}$ m), and measures movement in a vertical (Z-axis) direction of the tip, i.e., the height of the sample surface, by using the deflection of the cantilever depending on a variation in the height of the sample surface. Then the AFM controls the height of a fixed part of the cantilever by using the height of the sample surface as a feedback signal, thereby keeping the deflection of the cantilever constant.

A method for measuring a displacement of a tip using the above AFM can be classified into two in principle.

FIG. 1 is a diagram illustrated to describe one method for measuring a displacement of a tip in an AFM. A laser beam irradiated from a laser light source (not shown) and then reflected at a reflective surface 102 of a cantilever 101 is detected by a position sensing detector 103, thereby measuring a variation in reflected positions of the laser beam. Then an angular deflection of the cantilever 101 is measured based on the variation in positions of the laser beam.

In order to precisely measure the angular deflection of the cantilever 101, the cantilever 101 should be far from the position sensing detector 103. Due to this restricted condition, it is difficult to manufacture a small-sized head or raise measurement sensitivity.

FIG. 2 is a diagram illustrated to describe another method for measuring a displacement of a tip in an AFM. A laser beam coming from a laser light source (not shown) is irradiated at a reflective surface 202 of a cantilever 201 through an optical fiber 203. A distance between an end 204 of the optical fiber 203 and the reflective surface 202 of the cantilever 201 is measured by using interferences between a laser beam reflected at the end 204 of the optical fiber 203 and that reflected at the reflective surface 202 of the cantilever 201. If this measuring method is used, it is possible to manufacture the small-sized head of the AFM and have high resolution in principle.

However, an actually measured value does not reach theoretical resolution because the end of the optical fiber is parallel to the reflective surface of the cantilever and thus the intensity of the laser beam returning to the optical fiber by being reflected at the reflective surface of the cantilever is weak.

In a typical single-mode optical fiber, since a core through which light passes is only a few micrometers ($10^{-6}$ m) in diameter, a probability that light irradiated at the reflective surface of the cantilever returns to the optical fiber is low and the strength of a signal is also weak. That is, the signal returning to the optical fiber is vulnerable to electric and mechanical noises and resolution is deteriorated.

SUMMARY OF THE INVENTION

It is therefore an object of the present invention to provide a Fabry-Perot resonator for satisfying its resonance condition irrespective of the deflection or warp of a cantilever by using an optical fiber having an end of a concave mirror shape.

It is another object of the present invention to provide a system for precisely measuring a distance between an optical fiber and a cantilever and keeping the distance constant by raising the strength and sensitivity of a signal reflected at the cantilever by using the Fabry-Perot resonator.

It is still another object of the present invention to provide a system for minimizing the size of a head of an AFM, by separating a light source and a position sensing detector from a cantilever and constructing the head of the AFM only with the cantilever and an optical fiber.

According to one aspect of the present invention, a Fabry-Perot resonator using an optical fiber having an end of a concave mirror shape includes a cantilever having an upper side of a reflective surface and having a lower side with a tip for touching a sample, for moving in a Z-axis direction along with a head body by interlocking a piezoelectric element fixed at a column of an atomic force microscope, an optical fiber having one end connected to a light source for irradiating a laser beam, and the other end of a concave mirror shape apart from the reflective surface of the cantilever by a predetermined distance, and an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever.

Preferably, the optical fiber is away from the cantilever by 1–10 micrometers.

According to another aspect of the present invention, a system for measuring a displacement of a tip of a cantilever using a Fabry-Perot resonator in an atomic force microscope, includes a cantilever having an upper side of a reflective surface and having a lower side with a tip for touching a sample, for moving in a Z-axis direction along with a head body by interlocking a piezoelectric element fixed at a column of an atomic force microscope, an optical fiber having one end connected to a light source for irradiating a laser beam, and the other end of a concave mirror shape apart from the reflective surface of the cantilever by a predetermined distance, an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever, and a signal processor for calculating an error signal proportional to a displacement of the cantilever from the signals detected from the optical detector, and thereby obtaining a variation in a distance between the end of the concave mirror shape of the optical fiber and the reflective surface of the cantilever.

Preferably, the optical fiber is away from the cantilever by 1–10 micrometers.

Preferably, the signal processor calculates the error signal between a predetermined reference value and strength of the signal received from the optical detector, and obtains the variation in the distance between the end of the concave mirror shape of the optical fiber and the reflective surface of the cantilever by using the error signal.

Preferably, the signal processor calculates a differential value of the signal received from the optical detector, and obtains the variation in the distance between the end of the concave mirror shape of the optical fiber and the reflective surface of the cantilever by using the differential value.

According to still another aspect of the present invention, a system for calibrating a displacement of a tip of a cantilever using a Fabry-Perot resonator in an atomic force microscope, includes a cantilever having an upper side of a reflective surface and having a lower side with a tip for touching a sample, for moving in a Z-axis direction along with a head body by interlocking a piezoelectric element fixed at a column of an atomic force microscope, an optical fiber having one end connected to a light source for irradiating a laser beam, and the other end of a concave mirror shape apart from the reflective surface of the cantilever by a predetermined distance, an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever, a signal processor for calculating an error signal proportional to a displacement of the cantilever from the signals detected from the optical detector, obtaining a variation in a distance between the end of the concave mirror shape of the optical fiber and the reflective surface of the cantilever, and generating a feedback signal to calibrate and keep the distance therebetween constant, and a servo circuit part for moving the cantilever and the optical fiber in a Z-axis direction by actuating the piezoelectric element by the feedback signal generated from the signal processor, so that the distance between a sample and the tip of the cantilever is kept constant.

Preferably, the optical fiber is away from the cantilever by 1–10 micrometers.

Preferably, the signal processor calculates the error signal between a predetermined reference value and strength of the signal received from the optical detector, and obtains the variation in the distance between the end of the concave mirror shape of the optical fiber and the reflective surface of the cantilever by using the error signal.

Preferably, the signal processor calculates a differential value of the signal received from the optical detector, and obtains the variation in the distance between the end of the concave mirror shape of the optical fiber and the reflective surface of the cantilever by using the differential value.

BRIEF DESCRIPTION OF THE DRAWINGS

The accompanying drawings, which are included to provide a further understanding of the invention and are incorporated in and constitute a part of this application, illustrate an embodiment of the invention and together with the description serve to explain the principle of the invention. In the drawings.

DETAILED DESCRIPTION OF THE INVENTION

Figure 1:
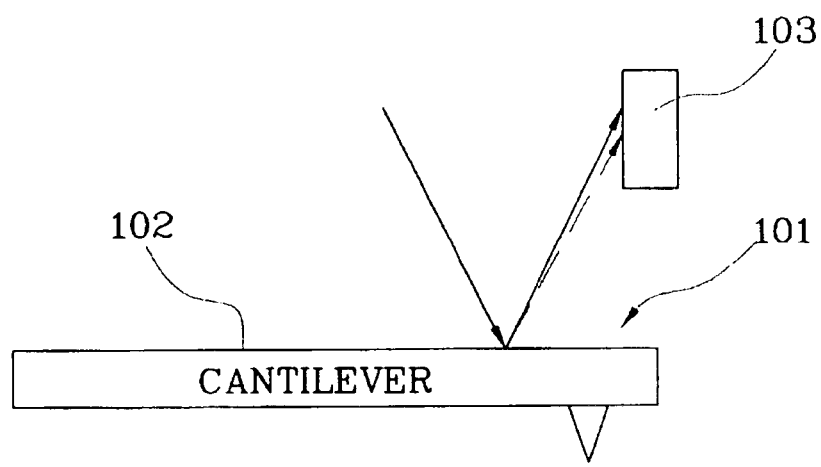
FIG. 1 illustrates a conventional construction for measuring a displacement of a cantilever tip in an AFM.
Figure 2:
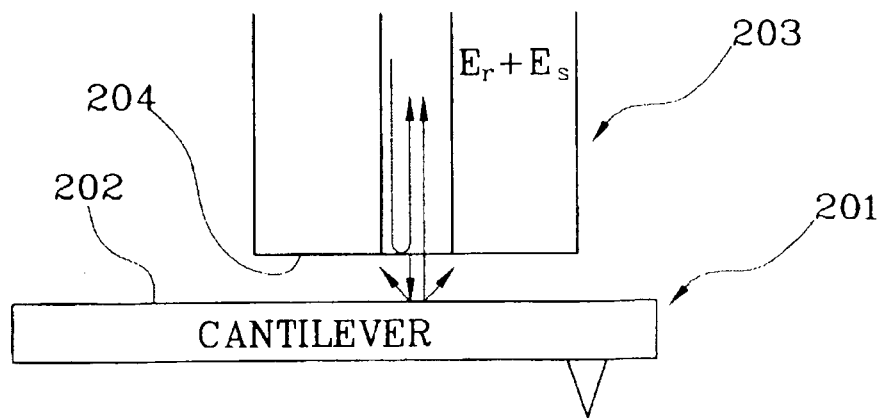
FIG. 2 illustrates another conventional construction for measuring a displacement of a cantilever tip in an AFM.
Figure 3:
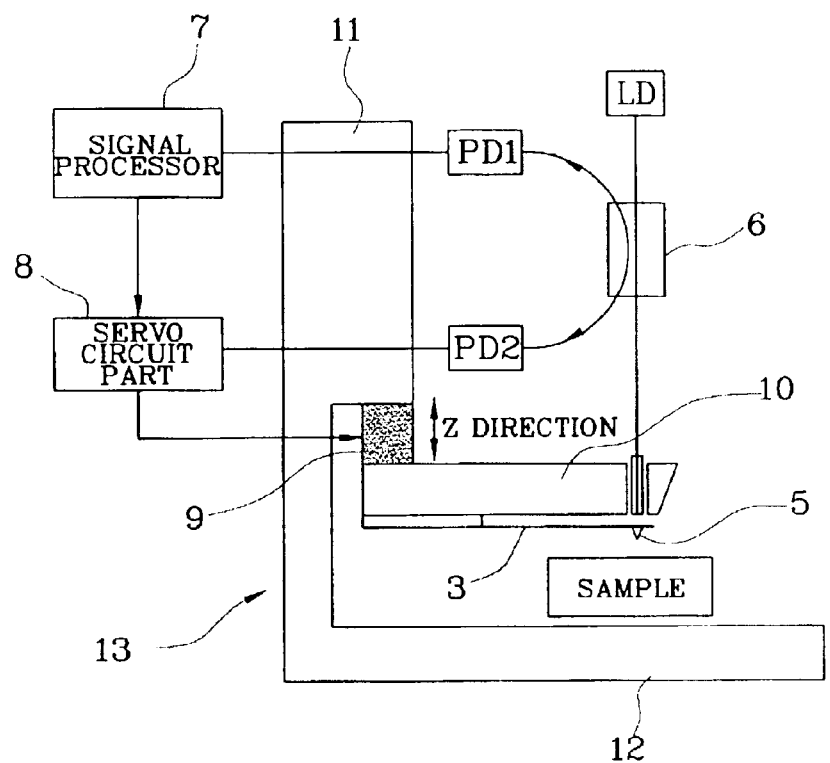
FIGS. 3 and 4 illustrate a Fabry-Perot resonator and a system for measuring and calibrating a displacement of a tip of a cantilever using the resonator, according to the present invention.
Figure 4:
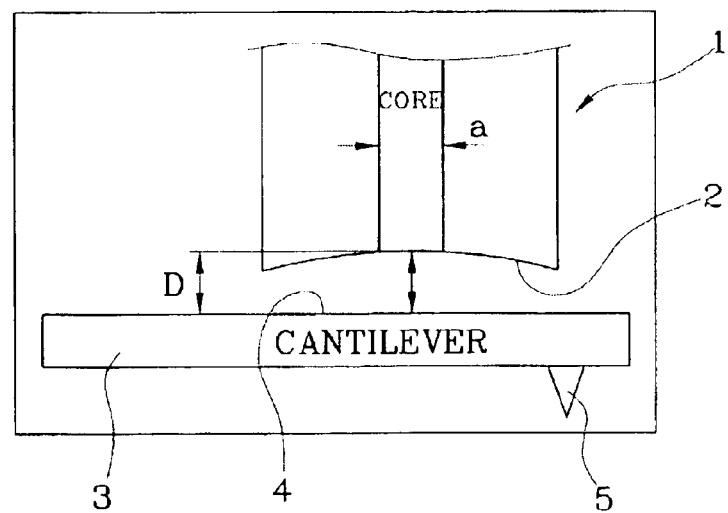

Referring to FIGS. 3 and 4, an AFM 13 is comprised of an AFM column 11 and an AFM body 12. A head body 10 is fixed at a predetermined height of the AFM column 11 through a piezoelectric element 9 moving in the Z-axis direction. An optical fiber 1 for measuring a displacement of a cantilever 3 is downward fixed at one side of the head body 10. The cantilever 3 positioned below the head body 10 has a tip 5 for touching a sample mounted on the AFM body 12 and is away from the optical fiber 1 by a predetermined distance D.

The optical fiber 1 disposed opposite to the cantilever 3 has an end 2 of a concave mirror shape. The upper side of the cantilever 3 has a reflective surface 4. The distance D between the cantilever 3 and the optical fiber 1 is 1–10 $\mu$m. Therefore, most of lights irradiated at the reflective surface 4 of the cantilever 3 through the optical fiber 1 are reflected toward a core of the optical fiber 1.

In order to raise accuracy when measuring a displacement by a non-contact technique, i.e., optically by means of an AFM having a cantilever warped even at minute force such as nano Newton, the strength of signals received from photo diodes PD1 and PD2, position sensing detectors, should be strong. Moreover, the signals should not sensitively respond to vibration or alignment, and an error signal obtained from the strength of the signal, for obtaining a displacement of the tip 5 of the cantilever 3 should have a large value.

When a single-mode optical fiber used in the AFM carries lights through the core with a few $\mu$m in diameter, photons passing through the optical fiber are repeatedly reflected between the cantilever 3 and the optical fiber 1. If the photons are reflected at the core, a part of the photons return to the optical fiber 1. Therefore, the photons reciprocating between the end 2 of the optical fiber 1 and the reflective surface 4 of the cantilever 3 increase in the intensity of a signal as the number of photons reflected at the core of the optical fiber 1 increases, and create multiple optical interferences, thereby enabling the AFM to accurately measure the displacement.

In general, if two surfaces are parallel, the number of reflected photons is determined by the parallel degree of the two surfaces, an incident angle of a photon and the distance between the two surfaces. Because lights passing through the optical fiber are widely spread, the number of reflected photons at the core is not large in the surfaces. Meanwhile, if one surface is a concave mirror shape, photons can satisfy a stable condition which is reciprocally reflected between the two surfaces.

The piezoelectric element 9 fixing the head body 10 and the cantilever 3 of an elastic element at the AFM column 11 is for constantly maintaining the distance between the sample mounted on the AFM body 12 and a head, that is, the cantilever 3 by moving in the Z-axis direction. One side of the piezoelectric element 9 is fixed at the AFM column 11 and the other side thereof is fixed at the head body 10. The length of the piezoelectric element 9 varies according to a voltage applied from the exterior so that it can adjust the distance between the sample and the cantilever 3. In this case, while the distance between the optical fiber 1 and the cantilever 3 varies according to the length of the piezoelectric element 9 by the control of a servo circuit part 8, it can also vary according to the sample touching the tip 5 of the cantilever 3. In other words, if the sample touches the tip 5 of the cantilever 3, the distance between the optical fiber 1 and the cantilever 3 becomes narrow. Contrarily, if the sample is away from the tip 5 and thus there is no force pressing the cantilever 3, the cantilever 3 returns to the original position by an elastic force and the distance between the optical fiber 1 and the cantilever 3 is kept constant.

The optical fiber 1 having one end 2 of the concave mirror shape fixed at the head body 10 has the other end connected to a laser diode LD, a light source, for irradiating a laser beam. The middle side of the optical fiber 1 is connected to the photo diodes PD1 and PD2 through a directional coupler 6. The directional coupler 6 is one element of an optical fiber and consists of two optical fibers adhering to each other. The directional coupler 6 enables the photo diode PD2 to detect a part of lights irradiated at the laser diode LD. The directional coupler 6 also enables the photo diode PD1 to detect lights reflected at the end 2 of the optical fiber 1 after being irradiated at the laser diode LD and lights incident upon the core of the optical fiber 1 after being reflected at the reflective surface 4 of the cantilever 3 through the end 2 of the optical fiber 1, as a signal for measuring the distance between the optical fiber 1 and the cantilever 3. All the lights reflected at a Fabry-Perot resonator are not necessarily detected by the photo diode PD1. A part of those lights are transmitted toward the laser diode LD through the optical fiber 1.

A signal processor 7 connected to the photo diodes PD1 and PD2 receives a reference signal from the photo diode PD2 and a measurement signal for measuring the distance between the optical fiber 1 and the cantilever 3 from the photo diode PD1. The signal processor 7 analyzes the reference signal and the measurement signal and calculates an error signal proportional to a displacement of the cantilever 3. Then the signal processor 7 obtains a variation in the distance between the end 2 of the optical fiber 1 and the reflective surface 4 of the cantilever 3 and generates a feedback signal for calibrating and keeping the distance therebetween constant. The servo circuit part 8 receiving the feedback signal from the signal processor 7 actuates the piezoelectric element 9 interposed between the head body 10 and the AFM column 11 and shifts the head body 10 and the cantilever 3 in the Z-axis direction so as to maintain the distance between the sample mounted on the AFM body 12 and the tip 5 of the cantilever 3 at a constant distance.

A variation in the distance D between the end 2 of the optical fiber 1 and the reflective surface 4 of the cantilever 3 is operated by the signal processor 7 in two methods.

Figure 5:
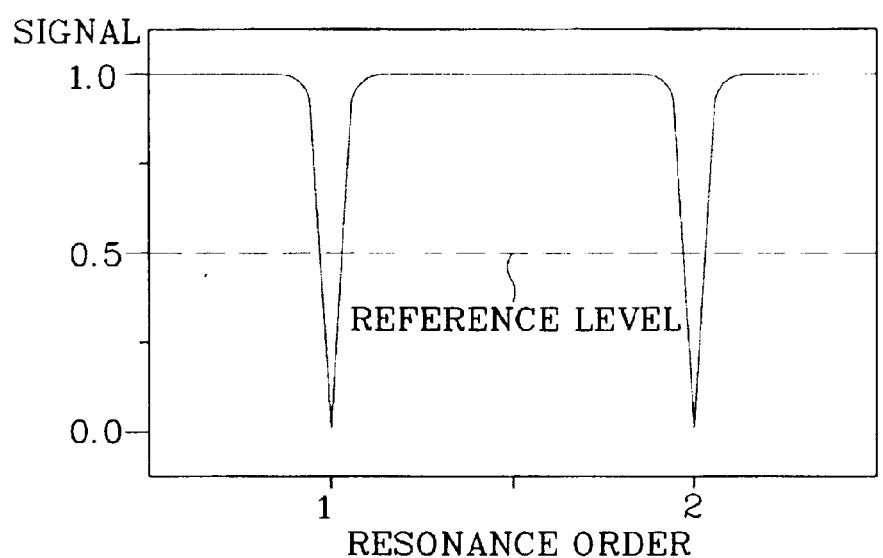
FIG. 5 is a graph illustrating a signal reflected at a Fabry-Perot resonator of FIGS. 3 and 4 as a function of the length of the resonator.

The signal processor 7 offsets a variation effect of an output of the laser diode LD by two signals $V_{PD1}$ and $V_{PD2}$ detected from the photo diodes PD1 and PPD2 so as to have a constant maximum value irrespective of the output of the laser diode LD as illustrated in FIG. 5.

In the first method, a positive (+) or negative (−) signal, that is, an error signal is calculated according to a variation in length of a Fabry-Perot resonator by subtracting a reference value Vr from the detection signals $V_{PD1}$ and $V_{PD2}$ detected from the photo diodes PD1 and PD2. The distance D between the end 2 of the optical fiber 1 and the reflective surface 4 of the cantilever 3 is obtained from the error signal. The reference value Vr may have any value between a minimum value and a maximum value of FIG. 5 but it is preferable to take a middle value. If the reference value Vr varies, the piezoelectric element 9 is actuated by the control of the servo circuit part 8 and the length of the Fabry-Perot resonator varies.

FIG. 5 illustrates a peak signal of a first resonance order and a second resonance order. The error signal can be obtained from the peak signal irrespective of the resonance order. The resonance order indicates a length of the Fabry-Perot resonator and represents that the laser diode and the Fabry-Perot resonator resonate at the corresponding length. An increase in the resonance order by 1 means that the length of the Fabry-Perot resonator varies by the wavelength of light irradiated at the laser diode LD. Since the present invention is directed to keep the length of the Fabry-Perot resonator constant, a signal of any resonance order may be used.

Figure 6:
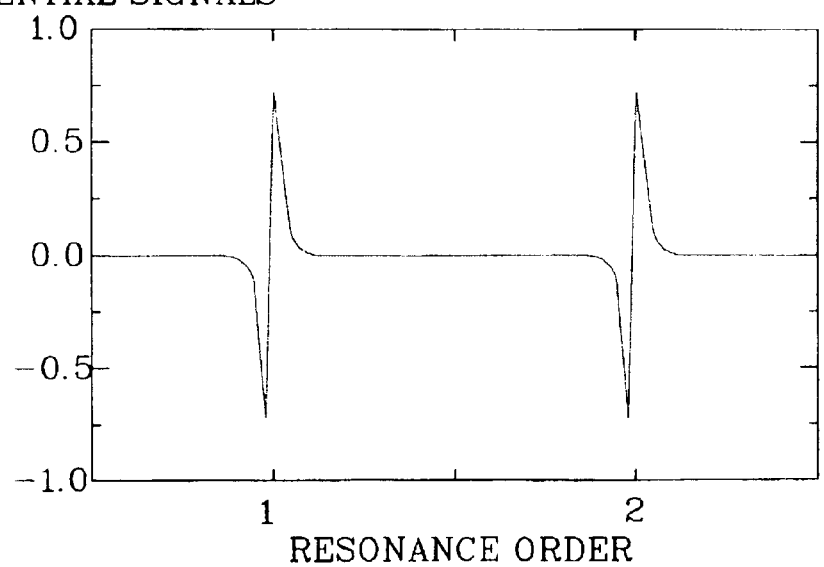
FIG. 6 is a graph illustrating a differential value of the reflected signal shown in FIG. 5.

In another method, the length of the piezoelectric element 9 is modulated to a specific frequency and a specific amplitude. The detection signals $V_{PD1}$ and $V_{PD2}$ received from the photo diode PD1 are processed by a lock-in amplifier in the signal processor 7 to obtain differential signals. An error signal is obtained based on the differential signals as illustrated in FIG. 6 and the distance D between the end 2 of the optical fiber 1 and the reflective surface 4 of the cantilever 3 is calculated based on the error signal. In this case, the reference value is not used.

A description will now be made of a process of calculating a variation in the distance D between the optical fiber 1 and the cantilever 3 and calibrating a displacement of the cantilever 3 based on the distance D.

A laser beam irradiated from the laser diode LD is detected by the photo diode PD2 through the directional coupler 6 and provided to the signal processor 7 as a normalized signal for calibrating a variation in the output of the laser diode. A light reflected at the end 2 of the optical fiber 1 and simultaneously reflected at the reflective surface 4 of the cantilever 3 through the end 2 of the optical fiber 2 is incident upon the core of the optical fiber 1 and detected by the photo diode PD1 through the directional coupler 6, thus to be provided to the signal processor 7 as a measurement signal for measuring the variation in the distance D.

The signal processor 7 receiving the reference signal and the measurement signal from the two photo diodes PD1 and PD2 normalizes the signal received from the photo diode PD1 by the output signal of the laser diode LD received from the photo diode PD1 and calculates the error signal obtained by a difference with a predetermined reference value. Alternatively, the signal processor 7 obtains the error signal from the differential value obtained by modulating the length of the Fabry-Perot resonator, i.e., the distance between the end 2 of the optical fiber 1 and the reflective surface 4 of the cantilever 2 or the wavelength of the laser beam irradiated from the laser diode LD and by processing the detection signal detected by the photo diode PD1. The signal processor 7 then obtains a variation in the distance between the end 2 of the optical fiber 1 and the reflective surface 4 of the cantilever 3. Further, the signal processor 7 generates the feedback signal for constantly maintaining the distance between the sample and the tip 5 of the cantilever 3 by using the obtained error signal, and provides the feedback signal to the servo circuit part 8. Therefore, the piezoelectric element 9 is driven by the control of the servo circuit part 8, and the cantilever 3 and the optical fiber 1 are moved in the Z-axis direction, thereby keeping the distance between the tip 5 and the sample constant.

As described above, the resonance condition of the Fabry-Perot resonator can be satisfied irrespective of a warp or tilt of the cantilever by the optical fiber having the end of the concave mirror shape disposed opposite to the cantilever. Moreover, the variation in the distance between the optical fiber and the cantilever can precisely be measured and a displacement of the cantilever can be kept constant by raising the magnitude and sensitivity of the signal reflected at the cantilever by using the Fabry-Perot resonator. Furthermore, the head of the AFM can be minimized by separating the light source and the optical detector from the cantilever and constructing the head of the AFM only with the cantilever and an optical fiber.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Fabry-Perot resonator using an optical fiber having an end of a concave mirror shape, comprising:
    a cantilever having an upper side of a reflective surface and having a lower side with a tip for touching a sample, for moving in a Z-axis direction along with a head body by interlocking a piezoelectric element fixed at a column of an atomic force microscope;
    an optical fiber having one end connected to a light source for irradiating a laser beam, and the other end of a concave mirror shape apart from the reflective surface of the cantilever by a predetermined distance; and
    an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever.

2. The Fabry-Perot resonator as claimed in claim 1, wherein the optical fiber is away from the cantilever by 1–10 micrometers.

3. A system for measuring a displacement of a tip of a cantilever using a Fabry-Perot resonator in an atomic force microscope, comprising:
    a cantilever having an upper side of a reflective surface and having a lower side with a tip for touching a sample, for moving in a Z-axis direction along with a head body by interlocking a piezoelectric element fixed at a column of an atomic force microscope;
    an optical fiber having one end connected to a light source for irradiating a laser beam, and the other end of a concave mirror shape apart from the reflective surface of the cantilever by a predetermined distance;
    an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever; and
    a signal processor for calculating an error signal proportional to a displacement of the cantilever from the signals detected from the optical detector, and thereby obtaining a variation in a distance between the end of the concave mirror shape of the optical fiber and the reflective surface of the cantilever.

4. The System as claimed in claim 3, wherein the optical fiber is away from the cantilever by 1–10 micrometers.

5. The system as claimed in claim 3, wherein the signal processor calculates the error signal between a predetermined reference value and strength of the signal received from the optical detector, and obtains the variation in the distance between the end of the concave mirror shape of the optical fiber and the reflective surface of the cantilever by using the error signal.

6. The system as claimed in claim 3, wherein the signal processor calculates a differential value of the signal received from the optical detector, and obtains the variation in the distance between the end of the concave mirror shape of the optical fiber and the reflective surface of the cantilever by using the differential value.

7. A system for calibrating a displacement of a tip of a cantilever using a Fabry-Perot resonator in an atomic force microscope, comprising:
    a cantilever having an upper side of a reflective surface and having a lower side with a tip for touching a sample, for moving in a Z-axis direction along with a head body by interlocking a piezoelectric element fixed at a column of an atomic force microscope;
    an optical fiber having one end connected to a light source for irradiating a laser beam, and the other end of a concave mirror shape apart from the reflective surface of the cantilever by a predetermined distance;
    an optical detector for detecting a signal reflected at the end of the concave mirror shape of the optical fiber through a directional coupler positioned at a predetermined location of the optical fiber and a signal incident through the end of the concave mirror shape of the optical fiber after being reflected at the reflective surface of the cantilever;
    a signal processor for calculating an error signal proportional to a displacement of the cantilever from the signals detected from the optical detector, obtaining a variation in a distance between the end of the concave mirror shape of the optical fiber and the reflective surface of the cantilever, and generating a feedback signal for keeping the distance therebetween constant; and
    a servo circuit part for moving the cantilever and the optical fiber in a Z-axis direction by actuating the piezoelectric element by the feedback signal generated from the signal processor, so that the distance between a sample and the tip of the cantilever is kept constant.

8. The System as claimed in claim 7, wherein the optical fiber is away from the cantilever by 1–10 micrometers.

9. The system as claimed in claim 7, wherein the signal processor calculates the error signal between a predetermined reference value and strength of the signal received from the optical detector, and obtains the variation in the distance between the end of the concave mirror shape of the optical fiber and the reflective surface of the cantilever by using the error signal.

10. The system as claimed in claim 7, wherein the signal processor calculates a differential value of the signal received from the optical detector, and obtains the variation in the distance between the end of the concave mirror shape of the optical fiber and the reflective surface of the cantilever by using the differential value.

* * * * *